June 20, 1967 E. G. GREEN 3,327,159

KLYSTRON HAVING MOVABLE TUNING WALL, STIFFENING MEMBERS BONDED TO THE TUBE BODY AND COLLECTOR MOUNTING MEANS UNDER COMPRESSION

Filed Sept. 30, 1963

INVENTOR.

ELDEN G. GREEN

BY Harry E. Aine

ATTORNEY

United States Patent Office 3,327,159
Patented June 20, 1967

3,327,159

KLYSTRON HAVING MOVABLE TUNING WALL, STIFFENING MEMBERS BONDED TO THE TUBE BODY AND COLLECTOR MOUNTING MEANS UNDER COMPRESSION

Elden G. Green, Palo Alto, Calif., assignor to Varian Associates, Palo Alto, Calif., a corporation of California
Filed Sept. 30, 1963, Ser. No. 312,766
9 Claims. (Cl. 315—5.38)

This invention relates generally to klystron amplifiers.

In the manufacture and installation of klystron amplifiers adapted to generate a fixed frequency, it is often necessary to adjust or trim the frequency to compensate for differences in frequency of operation between one tube and another which may arise during the manufacturing process due to differences in dimensions or spacing of the elements between different tubes. Sometimes adjustment or trimming is required because of differences in loading provided by the system in which the amplifier is used. The frequency adjustment or trimming is generally required only over a relatively narrow band of frequencies. For example, in an X-band tube, the frequency adjustment need only be in the order of 25 mc.

It is desirable that the adjustment be relatively simple to make and that the adjusting mechanism be easily accessible. The frequency adjusting mechanism should be protected from movement due to acceleration forces from jarring and the like so that the amplifier frequency will remain relatively stable.

Amplifiers of this type are often mounted in C-shaped magnetic structures with the input and output waveguides extending outwardly from one side of the structure. In the past, the tuning mechanisms have, in general, been arranged on the side of the tube opposite the output and input waveguides. In many instances where the associated load circuit as well as the tube must be adjusted, it is desirable to be able to tune the tube from the waveguide side. Tuning mechanisms of the prior art have included a differential screw arrangement driving directly a flexible wall portion of a corresponding resonator.

In many applications, the tubes, as described above, are permanently mounted in a magnetic structure and the assembly subjected to large accelerating forces. In tube structures including metal-to-ceramic seals, there is a tendency for the metal to peel away from the ceramic during acceleration. This is pronounced when there are bending moments which tend to put the seal under tensile strain.

The body portion of tubes of this type are generally machined from a block of metal having good thermal and electrical conductivity, for example, oxygen-free high conductivity copper. In general, the metal employed is relatively soft and it tends to deform under high accelerating forces.

It is a general object of the present invention to provide an improved klystron amplifier.

It is another object of the present invention to provide a klystron amplifier having a simple tuning mechanism.

It is another object of the present invention to provide a klystron amplifier having a tuning mechanism which is relatively immune to forces of acceleration.

It is a further object of the present invention to provide a klystron amplifier in which the tuning mechanism can be adjusted from the same side of the tube as the input and output waveguides.

It is still a further object of the present invention to provide an improved mounting arrangement for mounting klystron amplifiers in a magnetic structure.

It is a further object of the present invention to provide a klystron amplifier mounted in a magnetic structure in such a manner that the metal-to-ceramic seals are under compressive forces to thereby minimize any danger of tensile forces being developed as a result of large acceleration forces.

It is a further object of the present invention to provide a klystron amplifier having a relatively stiff body structure.

Other features and advantages of this invention will become apparent from the following description taken in conjunction with the accompanying drawings wherein.

Figures 1, 2, 3:
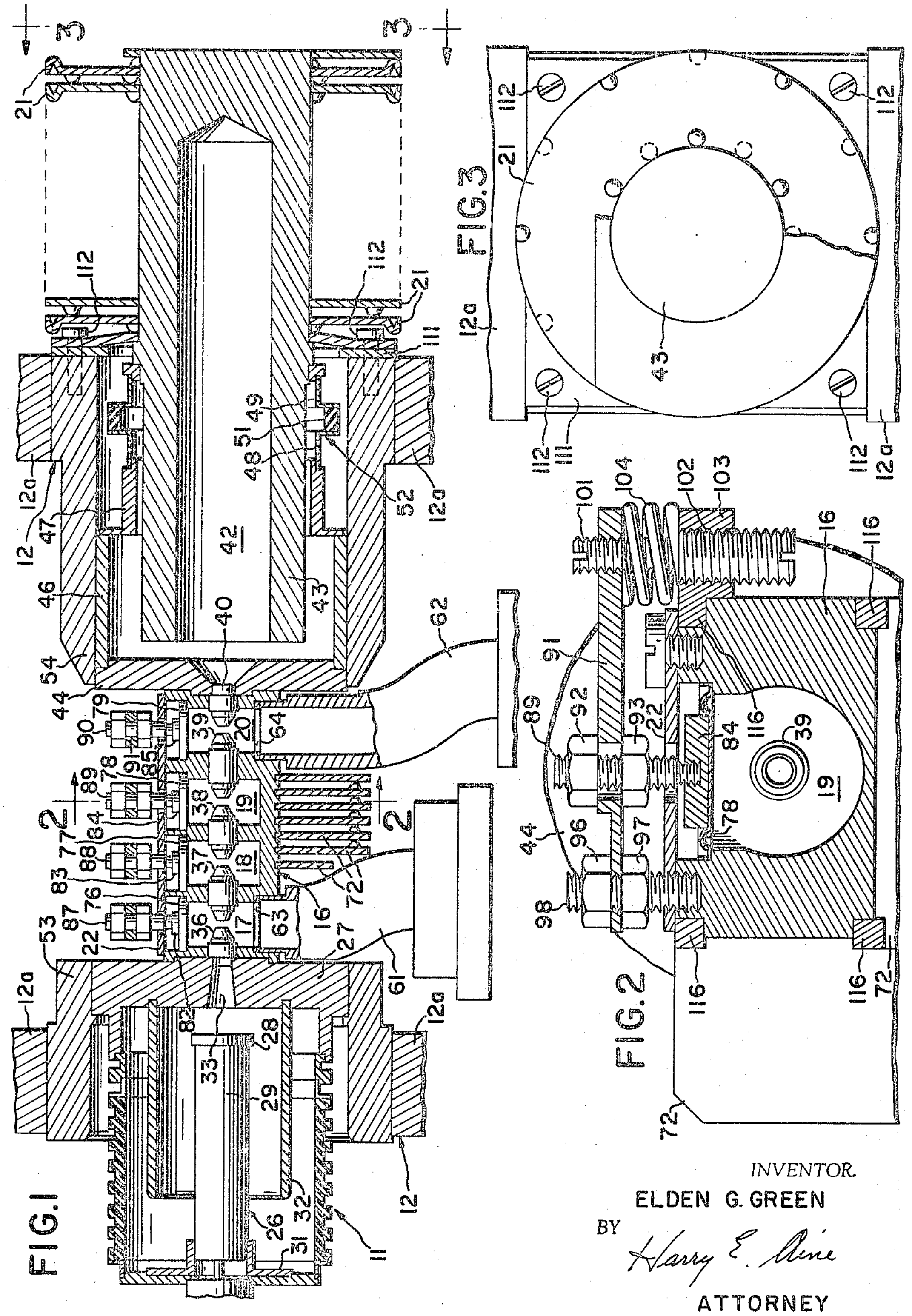
FIG. 1 is a plan view in section of a klystron amplifier in accordance with the present invention.
FIG. 2 is a sectional view of the amplifier of FIG. 1 taken generally along the line 2—2.
FIG. 3 is an end view, partly in section, of the klystron amplifier taken generally along the line 3—3 of FIG. 1.

Referring to FIGS. 1 and 2, there is shown a klystron 11 mounted in a magnetic structure 12, only the pole pieces of which are shown. The tube 11 comprises a body portion 16 which may be machined out of a solid block of metal to define cavity resonators 17, 18, 19 and 20. An X-ray shielding plate 22 as of copper is provided for closing the open end of the cavities formed in the block and for shielding operators and other equipment from X-rays generated by beam interception within the body of the tube. An electron gun assembly 26 is provided at one end of the tube body and suitably secured thereto as, for example, by brazing. The electron gun comprises an anode 27 brazed to the body 16, previously described. The anode supports the emitter 28 through a sleeve 29 and end plate 31. A cylindrical shield 32 is supported from the anode and extends coaxially of the emitter 28 to minimize ion bombardment of the outer sleeve portion and to reduce fields at the emitter. The anode is provided with a tapered aperture 33 through which the electrons are projected.

The focused beam leaving the emitter 28 flows through the tapered opening 33 and then through each of the drift tubes 36, 37, 38, 39 and 40, having central apertures aligned with the bore 33 for receiving the electron beam. The drift tubes cooperate to form the interaction gap within each of the resonators. The ends of the drift tubes have opposed edges bevelled so that any secondary electrons emitted from the edges within the resonators move normally with respect to the bevelled end surfaces and fly off into the interior of the resonator.

After leaving the final cavity 20, the beam passes through the drift tube 40 and into the interior bore 42 of the collector 43. The bore has considerable depth so that the beam can be collected over a relatively large area to minimize hot spots. The large collector conducts heat to the cooling fins 21 suitably brazed thereto. The collector 43 is supported from a pole piece 44, secured to the body, via sleeve 46 which in turn is secured to a smaller diameter sleeve 47. A metal to dielectric seal assembly 52 supports the collector 43. The seal assembly includes annular metallic frame members 48 and 49 sandwiching therebetween cylindrical insulator body 51 as of alumina ceramic.

Interposed between the magnetic pole pieces 12*a*, and the anode pole piece 27 and collector pole piece 44 are sleeves 53 and 54, respectively, of magnetic material. These sleeves provide a low reluctance path between the magnetic focusing means, the anode pole piece 27 and collector pole piece 44 which are also of magnetic material and cooperate to set up substantially axial magnetic fields between pole pieces 27 and 44 for focusing the beam.

To provide coupling of radio frequency into and out of the first and last cavity, the rectangular body 16 is cut away on one of its side portions for the reception of conventional waveguide sections 61 and 62 which communicate with the first and last resonator cavities 17 and 20, respectively, through openings 63 and 64. Suitable RF windows (not shown) of wave permeable material, such as alumina ceramic, are positioned at the end of waveguide sections 61 and 62. The ends of the waveguide sections are provided with suitable flange assemblies.

The body of the tube may be provided with radiating fins 72 for conducting heat away from the body and radiating it to the surrounds. Likewise, the collector 43 is provided with cooling fins 21, previously described, to dissipate, by radiation and convection, the heat generated therein by the electron beam.

Each of the resonators 17, 18, 19 and 20 includes a movable wall portion 76, 77, 78 and 79. The wall is in the form of a movable diaphragm. The outside of each of the diaphragm includes a heat conductive block 82, 83, 84 and 85, respectively, which accommodate the end portions of a corresponding pin 87, 88, 89 and 90.

Referring more particularly to FIG. 2, there is illustrated the tuning mechanism associated with the third resonant cavity. The pin 89 as of stainless steel is suitably secured to a tuning arm 91 as of stainless steel by means of spaced nuts 92 and 93 threadably received by the pin and disposed on opposite sides of the tuning arm. One end of the arm is suitably clamped between the nuts 96 and 97 which are threadably received by a stud 98 as of stainless steel threadably received by the body 16. The free end of the tuning arm 91 threadably receives the end of tuning screw 101. The lower enlarged end of the tuning screw is threadably received at 102 by the member 103 fixed to the body 16. Interposed between the tuning arm 91 and the block 103 is a spring 104 which urges the arm away from the block 103. The enlarged end is provided with threads having a pitch which is less than the pitch of the threads on the portion of reduced diameter. By rotating the screw, it will move into the block 103 a first distance for each revolution. At the same time, the tuning arm 91, 0.050″ thick at its thin end and 0.125″ thick at its thick end, will move downwardly, as viewed in the figure, a greater distance because of the large pitch of the thread. If the threads have pitches of 36 and 40 threads per inch, for example, the movement of the arm 91 is approximately 1 mil for each revolution. Movement of the pin 89 is proportional to the movement of the end of the arm and is related thereto by the ratio of the distances from the pivot or flexure point of the arm 91 to the pins 89 and screw 101. A change of frequency of approximately 3 megacycles per revolution of the tuning screw is achieved with an arrangement such as that illustrated. Because of the relatively short height of the tuner mechanism from the body 16 and because of the rugged construction thereof the tuner is very non-microphonic. Note that the tuner is readily operated from either side of the tube, i.e., either the waveguide side or opposite side by insertion of a screw driver or other suitable tool into the screw slots provided in the ends of screw 101.

As described above, the klystron tube is disposed within a magnetic structure 12 which provides the magnetic fields for focusing the electron beam. The magnet may comprise two U-shaped leg or core portions having poles 12*a*. The poles are connected to the ring members 53 and 54 which are affixed to the outer periphery of the anode probe 27 and collector probe 44. The ring members 53 and 54, together with the associated anode 27 and member 44, set up an axial magnetic field for confining the beam extending through the resonators 17, 18, 19 and 20.

The tube is supported in the magnet by sleeve members 53 and 54. However, it is observed that the collector is supported by the metal-to-ceramic seal assembly 52. Any acceleration forces will tend to place the assembly 52 under tensile stress. To overcome this, the seal assembly 52 is placed under compression. A mounting plate 111 as of stainless steel 0.060″ thick is brazed to the collector 43 and secured to the adjacent portion of the sleeve member 54 by means of spaced screws 112. This plate is secured along the collector in such a manner that when it is tightly secured to the sleeve member 54, it will provide an axial compressive force on the seal assembly 52 as shown in FIG. 1. This axial compressive force is of such magnitude that any tensile forces which arise due to accelerating forces will have a lesser magnitude whereby the seal assembly is constantly under compression.

In order to provide rigidity to the body 16, there is provided along the edges of the rectangular body rods 116 of high strength non-magnetic material such as non-magnetic stainless steel of 0.125″ square cross-section. One of the rods forms the block 103 for receiving the tuning screw 101. The four body rods 116 are fitted in grooves formed in the body 16 and intimately brazed to the body to operate at body temperature and are brazed at their ends to pole pieces 27 and 44 to take any mounting stress off of the body 16. The arrangement of spaced rods provides substantial rigidity to the body. The need for rods 116 is surprising in view of the fact that the body 16 is formed from a solid block of copper.

Thus, there is provided a rugged klystron amplifier. It is relatively immune to high accelerating forces both from the electrical and mechanical point of view. The tube is easily trimmed to operate at a particular frequency.

Since many modifications and variations in the described arrangement can obviously be made without departing from the scope of the invention, it is intended that all matter in the foregoing description or shown in the accompanying drawings should be interpreted as illustrative and not in a limiting sense.

What is claimed is:

1. A klystron comprising, a tube body having a plurality of resonator cavities therein, said cavities including drift tubes establishing interaction gaps, an electron gun arranged at one end of said body for projecting a beam of electrons through said drift tubes and cavities in succession along an elongated central beam axis, a hollow collector positioned at the other end of said body for receiving the electron beam, a movable side wall formed in each of said cavities, said side walls being disposed substantially parallel to said elongated central beam axis, means for moving said wall to tune said klystron by inductively tuning the cavities by moving said side walls in a direction transverse to said elongated central beam axis, said last named means comprising a tuning arm having one end mounted for pivoting movement, means for moving the other end of said arm, and means intermediate the ends of said arm engaging said movable wall to move the same in response to movement of the arm.

2. Apparatus as in claim 1 wherein said one end of said arm is secured to said body.

3. A klystron comprising, a tube body having a plurality of resonator cavities therein, said cavities including drift tubes establishing interaction gaps, an electron gun arranged at one end of said body for projecting a beam of electrons through said drift tubes and cavities in succession, a hollow collector positioned at the other end of said body for receiving the electron beam, a movable wall formed in each of said cavities, means for moving said wall to tune said klystron, said last named means comprising a tuning arm having one end mounted for pivoting movement, means for moving the other end of said arm, and means intermediate the ends of said arm engaging said movable wall to move the same in response to movement of the arm, one end of said tuning arm being secured to said body, said means for moving the other end of said arm comprising a tuning screw having a first portion threaded with a first pitch and a second portion threaded with a second pitch, said portion having said first pitch being threadably received by said other end of said arm and said portion having said second pitch being threadably received by a member secured to said body whereby rotating movement of said screw serves to move the end of said arm an amount corresponding to the difference in pitch between said first and second threaded portion of said tuning screw.

4. A klystron as in claim 3 wherein said screw is adapted to be adjusted from the body side of said klystron.

5. A klystron comprising, a tube body formed from a block of conductive metal and having a plurality of resonator cavities formed therein, said cavities including drift tubes establishing interaction gaps, an electron gun for projecting a beam of electrons through said drift tubes and cavities in succession, a hollow collector carried by the other end of said body for receiving the electron beam, and a plurality of longitudinal stiffening members secured to spaced portions of said block body, a wall of at least one of said cavities being movable and including means for moving said wall for tuning said klystron, said last named means comprising a tuning arm having one end mounted on said body for pivoting movement, a tuning screw having a first portion threaded with a first pitch and a second portion threaded with a second pitch, said first portion being threadably received by one of said stiffening members, said second portion being threadably received by the other end of said arm, and means intermediate the ends of said arm engaging said movable wall to move the same.

6. A klystron comprising, a tube body having a plurality of resonant cavities therein, said cavities including drift tubes establishing interaction gaps, an electron gun for projecting a beam through said drift tubes and said cavities in succession, a hollow collector electrode mounted at the other end of said body for receiving the electron beam, said collector mounting means including a metal-to-ceramic seal assembly, and means for providing a positive axial compressive force regardless of the orientation of the tube on said metal-to-ceramic seal assembly to maintain the same under compression, said means for providing a positive axial compressive force on said metal-to-ceramic seal assembly including an apertured plate having its apertured edge secured to said collector and its other edge flexed towards said body to provide compressive forces on said metal-to-ceramic seal assembly.

7. A klystron comprising, a tube body having a plurality of resonator cavities therein, said cavities having drift tubes establishing interaction gaps, an electron gun for projecting a beam through said drift tubes and cavities in succession, a hollow collector electrode positioned at the other end of said body for receiving the electron beam, a magnetic structure engaging said klystron to support the same, said collector being supported on said body by a metal-to-ceramic assembly, an apertured plate having its inner edge engaging said collector, and means for securing the outer edge of said plate to said magnetic structure, said plate being spaced along said collector such that said collector is urged towards said body of the tube when said plate is secured to said magnetic structure to place said seal assembly under compression.

8. A klystron comprising, a tube body formed from a block of conductive metal and having a plurality of resonator cavities formed therein, said cavities including drift tubes establishing interaction gaps, an electron gun for projecting a beam of electrons through said drift tubes and cavities in succession, a hollow collector carried by the other end of said body for receiving the electron beam, and a plurality of longitudinal stiffening members secured to spaced portions of said block body, stiffening members being rods of a material having a greater strength than the material of said block body, said rods being intimately bonded to said block body over a preponderance of their length.

9. A klystron as claimed in claim 8 wherein said block body is of generally rectangular transverse cross-section and wherein said rods are bonded to and integrally formed into and define the corner edges of said block body.

References Cited

UNITED STATES PATENTS

| | | | |
|---|---|---|---|
| 2,468,145 | 4/1949 | Varian | 315—5.22 |
| 2,468,152 | 4/1949 | Woodyard | 315—5.22 X |
| 2,680,209 | 6/1954 | Veronda | 315—5.48 X |
| 2,825,842 | 3/1958 | Kenyon | 315—5.22 |

FOREIGN PATENTS

| | | |
|---|---|---|
| 956,777 | 1/1957 | Germany. |

HERMAN KARL SAALBACH, *Primary Examiner.*

P. L. GENSLER, *Assistant Examiner.*